C. F. LANGFORD.

Seams of Boots and Shoes.

No. 8,228. Reissued May 14, 1878.

Witnesses:

Joseph Wells

Sam'l W. Sands

Inventor:

Charles F. Langford

N. PETERS, PHOTO-LITHOGRAPHER, WASHINGTON, D. C.

UNITED STATES PATENT OFFICE.

CHARLES F. LANGFORD, OF BROOKLYN, NEW YORK.

IMPROVEMENT IN SEAMS OF BOOTS AND SHOES.

Specification forming part of Letters Patent No. 129,970, dated July 30, 1872; Reissue No. 8,228, dated May 14, 1878; application filed February 25, 1878.

*To all whom it may concern:*

Be it known that I, CHARLES F. LANGFORD, of the city of Brooklyn, in the county of Kings and State of New York, have invented a new and useful Improvement for Protecting, Strengthening, and Finishing the Seams of Boots and Shoes, of which the following is a specification:

In the ordinary manufacture of boots and shoes the quarters of the upper are closed together by seams at the back and front. These seams present an unyielding surface upon the outside of the boot or shoe, and from their position are exposed to constant wear. The chafing of the clothing upon these seams soon wears away the surface of leather, (also the thread when this means is employed in closing and securing them,) thereby defacing and weakening the seams, when, owing to the constant strain upon them caused by the action of the foot, they become separate, necessitating frequent repairs.

I am aware that strips of leather forming independent raised surfaces have been employed in connection with these seams, either by closing the strip in the seam and allowing it to extend outside, or by securing a strip upon the outside of and covering the seam, as a means of obviating these objections, and it is well known that such strips of leather are comparatively stiff and inflexible. Hence the wear to which leather strips are subjected causes them soon to deteriorate more or less rapidly, the strips become broken or cracked more or less, and are caused to present a discolored appearance on their outer surface by the wearing off of the color applied thereto.

My invention has for its object to provide a means which shall obviate these objections; and to this end it consists in the application and adaptation of india-rubber as a substitute for the leather strips that are commonly used in connection with the seams of boots and shoes, and thus giving a superior protection and elasticity to such seams.

In carrying my invention into practice, the following mode is employed in applying rubber to the seam of a boot or shoe, which I will now describe.

Figure 1:
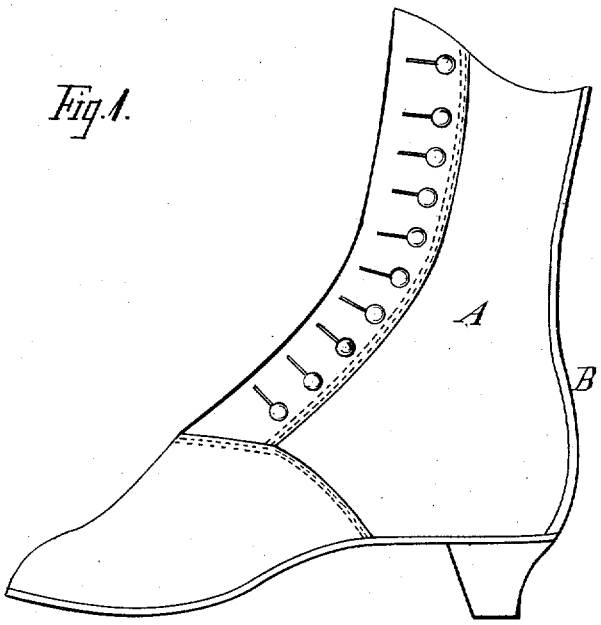
Figure 2:
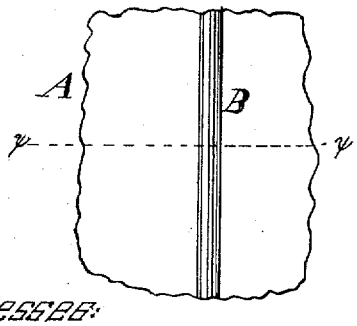
Figure 3:
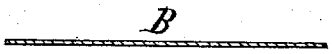

In the accompanying drawing, forming a part of this specification, Figure 1 is a side elevation of the boot. Fig. 2 is a fragmentary view, showing the strip or welt of rubber in front elevation. Fig. 3 is a sectional view taken through the dotted line *x x*, Fig. 2, showing the strip or welt of rubber inserted in the seam, with the bead or fold projecting upon the outside, and covering the seam.

On said drawings, B represents the strip or welt, which is made of rubber in any suitable manner. The welt is made from a strip of rubber, which may be plain or ornamented, and may be folded in a longitudinal direction through the middle, bringing the edges together, when it is ready for use.

If desired, a single thickness of heavier rubber can be used, with the edges finished in any suitable manner during the process of manufacture.

The strip or welt is applied to the seam of a boot or shoe as follows: When the boot or shoe is to be made up the strip or welt B is inserted between the two pieces of material, compressing the upper in such a manner as to leave a portion projecting upon the outside of the seam a sufficient distance to form an independent surface, which overlaps the seam, as shown in Fig. 3. The seam is then closed up and secured in any desired manner.

My improvement possesses the following advantages: First, the material is flexible, and therefore not liable to break or crack under flexure or wear; second, the material is of nearly uniform color throughout, therefore will not be caused by wear to present a discolored surface; third, the material is elastic, and consequently will expand after being closed in the seam, thereby making the seam perfectly tight; fourth, the surface which is subjected to wear is a tough elastic material, and therefore will last much longer than leather, and therefore cheaper.

I claim—

1. A rubber welt or protector arranged in relation to a seam substantially as described, for the purpose set forth.

2. In the manufacture of boots and shoes, a rubber welt or protector applied to the seam, substantially as and for the purpose stated.

CHARLES F. LANGFORD.

Witnesses:
JOSEPH WELLS,
JAS. W. SANDS.